(12) United States Patent
Greenland et al.

(10) Patent No.: US 11,276,542 B2
(45) Date of Patent: Mar. 15, 2022

(54) ENHANCED THERMAL TRANSFER NOZZLE AND SYSTEM

(71) Applicant: Varex Imaging Corporation, Salt Lake City, UT (US)

(72) Inventors: Kasey Otho Greenland, West Jordan, UT (US); Ronald Wayne Boutte, Layton, UT (US); Patrick Kevin Lewis, West Jordan, UT (US)

(73) Assignee: Varex Imaging Corporation, Salt Lake City, UT (US)

( * ) Notice: Subject to any disclaimer, the term of this patent is extended or adjusted under 35 U.S.C. 154(b) by 0 days.

(21) Appl. No.: 16/547,517

(22) Filed: Aug. 21, 2019

(65) Prior Publication Data

US 2021/0057181 A1 Feb. 25, 2021

(51) Int. Cl.
*H01J 35/10* (2006.01)
(52) U.S. Cl.
CPC .......... *H01J 35/106* (2013.01); *H01J 35/104* (2019.05); *H01J 35/107* (2019.05); *H01J 2235/1208* (2013.01); *H01J 2235/1262* (2013.01)
(58) Field of Classification Search
None
See application file for complete search history.

(56) References Cited

U.S. PATENT DOCUMENTS

| | | |
|---|---|---|
| 2,645,720 A | 12/1950 | Gross |
| 2,719,926 A | 10/1955 | Procter et al. |
| 3,124,689 A | 9/1959 | Shure |
| 3,214,586 A | 10/1965 | Graham |
| 3,396,272 A | 8/1968 | Olson |
| 3,721,825 A | 3/1973 | Rasmussen |
| 3,831,672 A * | 8/1974 | Battisti ................. F28F 9/0234 165/154 |
| 4,056,349 A | 11/1977 | Parisis |
| 4,283,629 A | 8/1981 | Habermehl et al. |
| 4,388,530 A | 6/1983 | Lubecki et al. |
| 4,490,832 A | 12/1984 | Ab |
| 4,698,832 A | 10/1987 | Kuusi |
| 4,785,175 A | 11/1988 | Wormald et al. |
| 5,384,819 A | 1/1995 | Ono |

(Continued)

FOREIGN PATENT DOCUMENTS

JP H03-222250 10/1991

OTHER PUBLICATIONS

"File/Twist Drill—Point Feometry.png—Wikimedia Commons," Apr. 17, 2017, XP055746427 (retrieved from the Internet on Aug. 31, 2021 at: https://commons.wikimedia.org/wiki/File:Twist_Drill_-_Point_Feometry.png.

(Continued)

*Primary Examiner* — Hoon K Song
(74) *Attorney, Agent, or Firm* — Laurence & Phillips IP Law

(57) ABSTRACT

Some embodiments include an x-ray system, comprising: a structure having a hole having an axially extending wall; and a nozzle disposed in the hole; wherein the nozzle and the axially extending wall form a plurality of axially extending helical fluid channels. Some embodiments include an x-ray system formed by shaping tubing to form a plurality of axially extending helical flutes; and forming a plurality of axially extending helical fluid channels by inserting the shaped tubing into a hole in a structure.

16 Claims, 12 Drawing Sheets

(56) References Cited

U.S. PATENT DOCUMENTS

| | | | |
|---|---|---|---|
| 5,524,038 | A | 6/1996 | Fong |
| 5,838,763 | A | 11/1998 | Hiller et al. |
| 6,477,236 | B1 | 11/2002 | Anno et al. |
| 7,801,278 | B2 | 9/2010 | Ito et al. |
| 8,009,806 | B2 | 8/2011 | Legall |
| 9,911,570 | B2 | 3/2018 | Tiwari et al. |
| 2003/0058991 | A1 | 3/2003 | Lott |
| 2004/0258198 | A1 | 12/2004 | Carver et al. |
| 2006/0193433 | A1 | 8/2006 | Ledoux |
| 2007/0195926 | A1 | 5/2007 | Chen et al. |
| 2007/0116177 | A1 | 8/2007 | Munker et al. |
| 2008/0056443 | A1 | 3/2008 | Hu et al. |
| 2008/0267345 | A1 | 10/2008 | Nagumo et al. |
| 2008/0283761 | A1 | 11/2008 | Robinson et al. |
| 2013/0028377 | A1 | 1/2013 | Kovarik et al. |
| 2015/0308487 | A1* | 10/2015 | Michiwaki ............... F16B 39/12 411/288 |
| 2016/0084967 | A1 | 3/2016 | Nygard |
| 2016/0170075 | A1 | 6/2016 | Schafer et al. |
| 2016/0313263 | A1 | 10/2016 | Featonby et al. |
| 2016/0320282 | A1 | 11/2016 | Dingman et al. |
| 2016/0370303 | A1 | 12/2016 | Schmitz et al. |
| 2017/0038316 | A1 | 2/2017 | Belcher et al. |
| 2017/0082556 | A1 | 3/2017 | Bueno et al. |
| 2017/0316916 | A1 | 11/2017 | Stevens et al. |
| 2018/0182085 | A1 | 4/2018 | Featonby |
| 2018/0151324 | A1 | 5/2018 | Lewis et al. |
| 2018/0100816 | A1 | 6/2018 | Zhao et al. |
| 2018/0277272 | A1 | 9/2018 | Park et al. |
| 2019/0103244 | A1* | 4/2019 | Kruse ................... H01J 35/106 |
| 2019/0186658 | A1 | 6/2019 | Rettew et al. |
| 2020/0264114 | A1 | 8/2020 | Zhu et al. |
| 2020/0289782 | A1* | 9/2020 | Sims ................. A61M 16/0808 |

OTHER PUBLICATIONS

PCT/US2020/047105, International Search Report, dated Nov. 12, 2020.

PCT/US2020/047105, Written Opinion, dated Nov. 12, 2020.

U.S. Appl. No. 16/852,279, Office Action, dated Aug. 6, 2021.

* cited by examiner

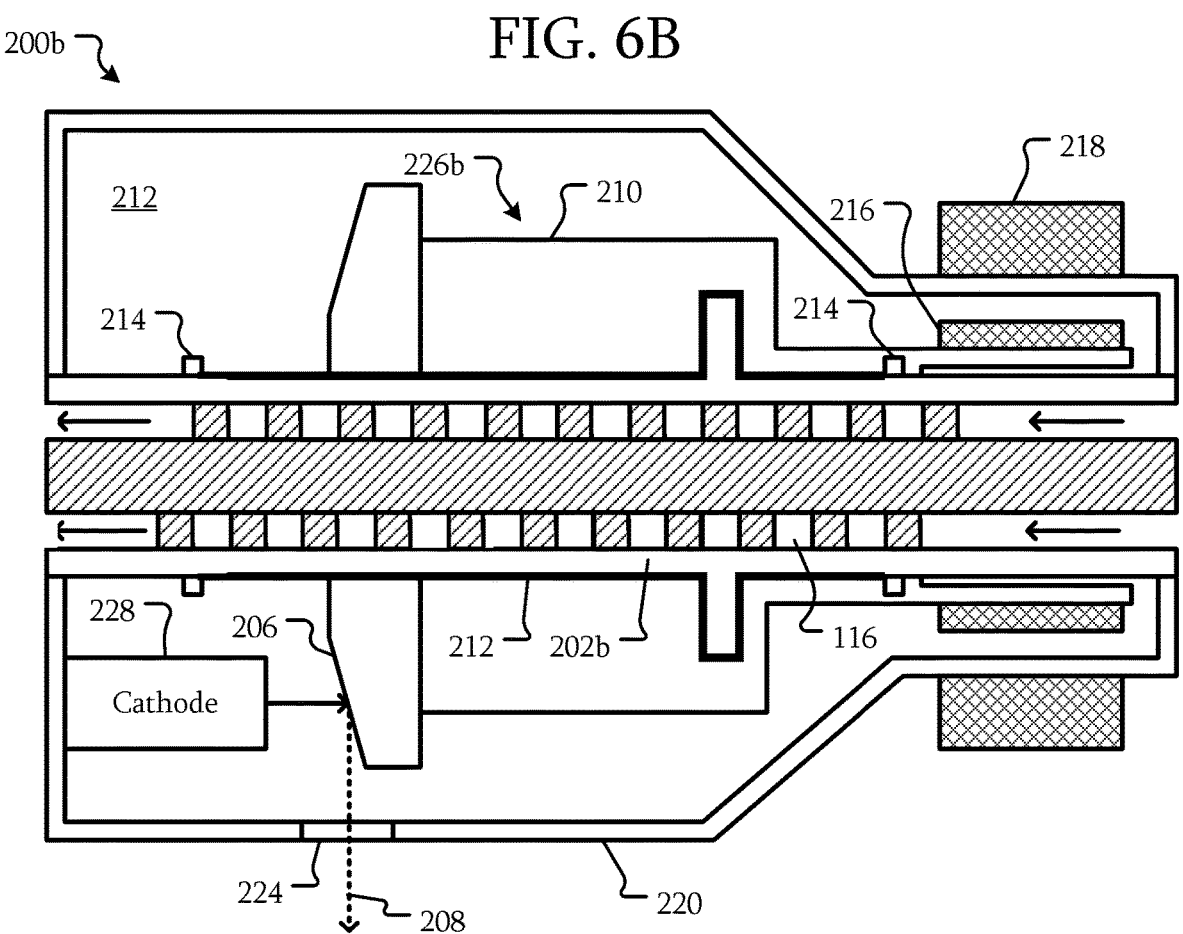

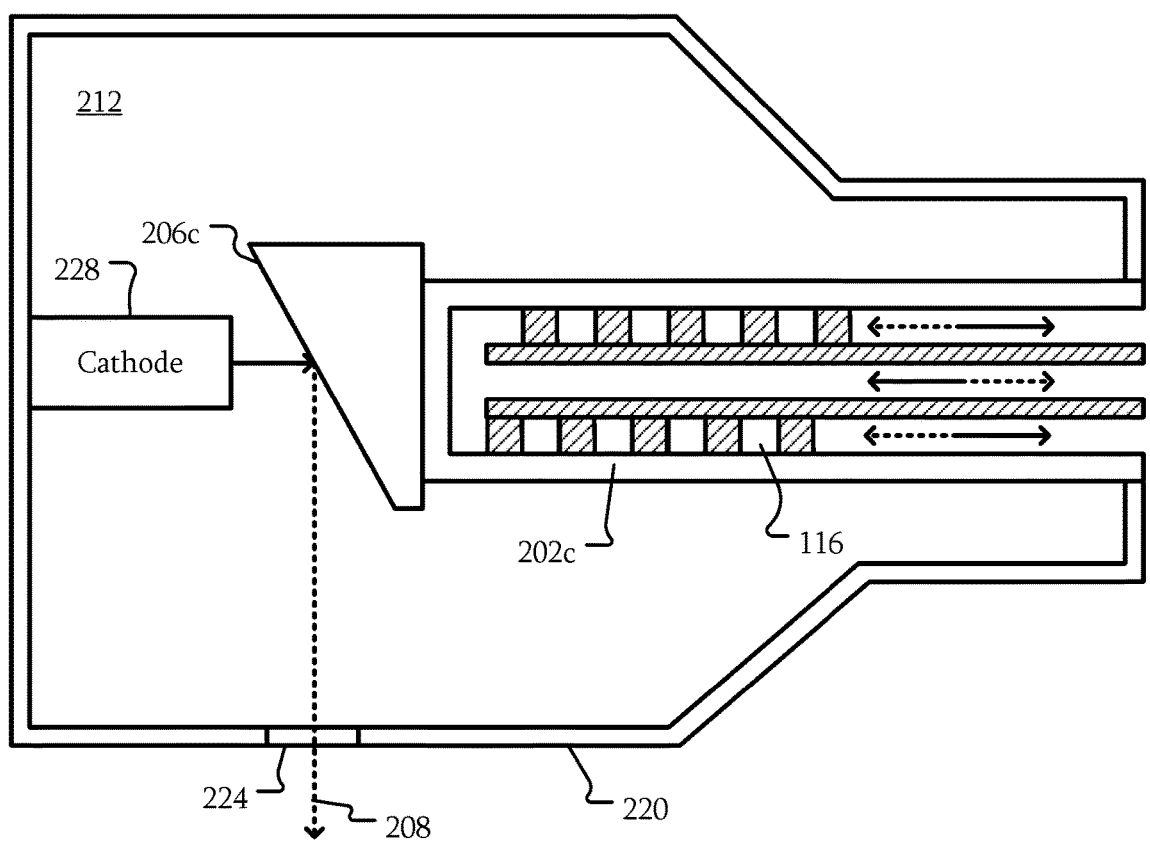

ENHANCED THERMAL TRANSFER NOZZLE AND SYSTEM

High power systems, such as high power x-ray tubes, may generate significant amounts of heat. The performance or power of the system may be limited by the amount of heat that may be removed by a cooling fluid. In a particular example, an x-ray tube may include a rotating anode that rotates about a bearing. A blind cavity in a bearing may be cooled to transfer heat from the rotating anode and other structures. A smooth-walled pipe may be used as a nozzle to inject the cooling fluid into the blind cavity.

BRIEF DESCRIPTION OF SEVERAL VIEWS OF THE DRAWINGS

FIGS. 6A-6C are block diagrams of x-ray systems with helical fluid channels according to some embodiments.

DETAILED DESCRIPTION

Embodiments will be described with systems including helical fluid channels. In some embodiments, the helical fluid channels result in a higher thermal transfer, allowing for higher power and/or higher duty cycle operation. Some embodiments include x-ray tubes with rotating or stationary anodes. The performance of the x-ray tubes may be limited by the amount of heat that may be transferred away from the anode and associated structures. Using a cooling system as described herein may allow for higher power x-ray tubes and/or higher patient/part throughput.

Figure 1A:
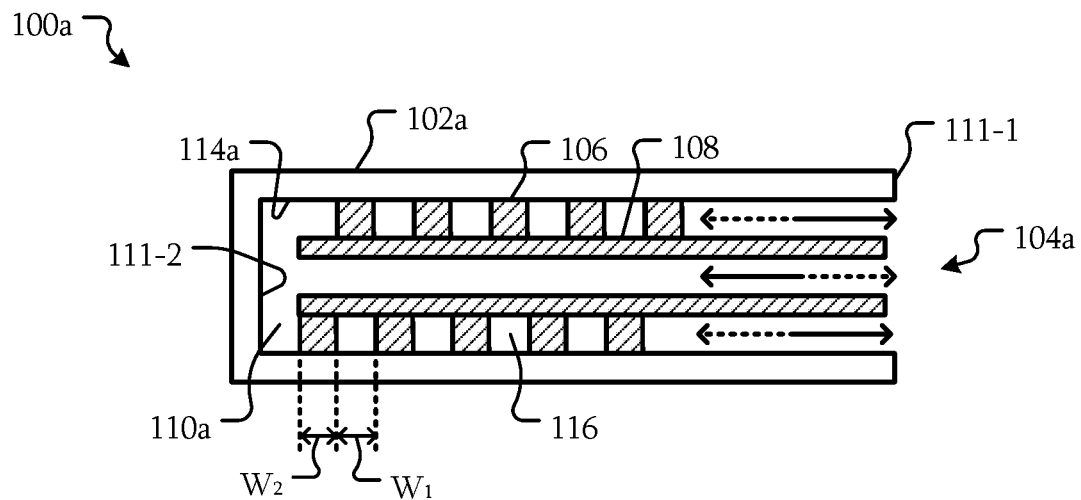
FIGS. 1A-1C are block diagrams of systems with helical fluid channels according to some embodiments.
Figure 1B:
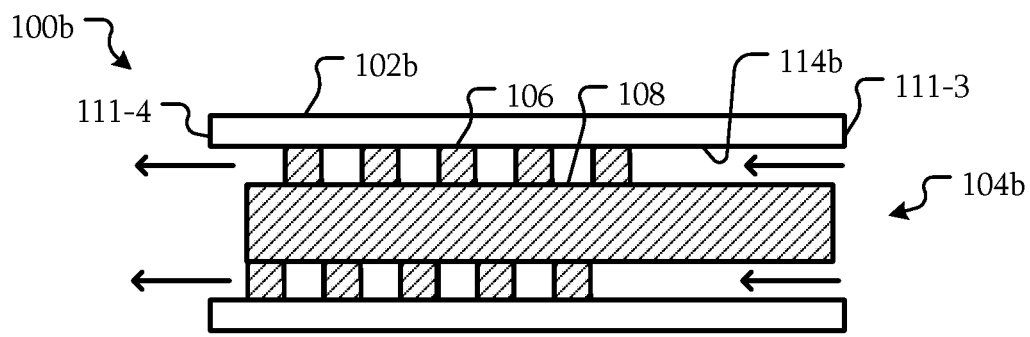
Figure 1C:
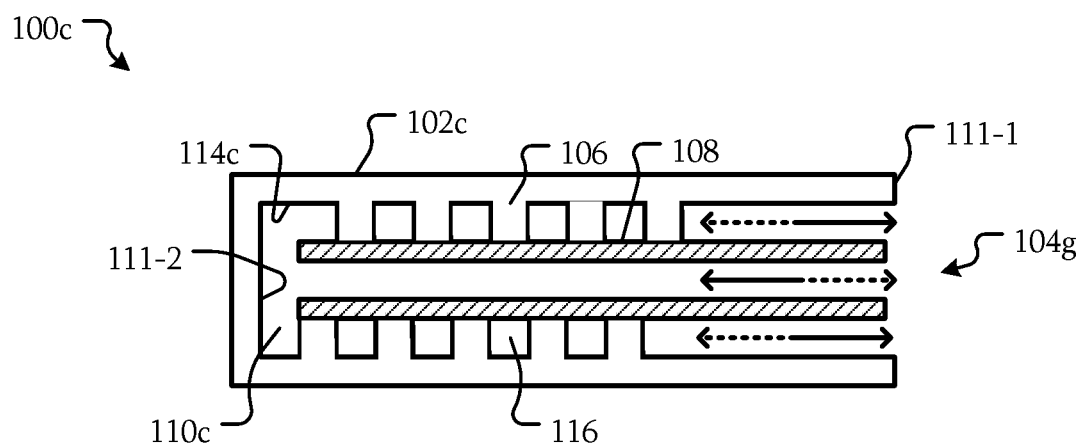

FIGS. 1A-1C are block diagrams of a systems with helical fluid channels according to some embodiments. Referring to FIG. 1A, in some embodiments, a system 100a includes a structure 102a and a nozzle 104a. The structure 102a may include any structure from which heat may be transferred. For example, the structure 102a may be part of a bearing system for supporting a rotating object, such as an anode of an x-ray system. In a particular example, the structure 102a may be part of a hydrodynamic bearing system for a rotating anode of an x-ray system. For example, U.S. Pat. No. 9,911,570 entitled "Antiwetting Coating for Liquid Metal" granted Mar. 2, 2018, provides an example of liquid metal bearing for a rotating anode using liquid metals such as gallium (Ga), indium (In), tin (Sn), alloys of these or similar metals, or the like. Although a rotating anode has been used as an example of a structure 102a, in other embodiments, the structure 102a may be part of a stationary anode of an x-ray system. In other embodiments, the structure 102a may be part of a component of an x-ray system where heat exchange may be performed other than an anode.

The structure 102a may include a variety of materials. For example, the structure 102a may include copper, aluminum, steel, or the like.

The structure 102a includes a hole 110a. In the structure 102a, the hole 110a is a blind hole having an open end 111-1 and a closed end 111-2. The hole 110a includes an axially extending wall 114a extending from the open end 111-1 to the closed end 111-2.

The nozzle 104a is disposed in the hole 110a. The nozzle 104a and the axially extending wall 114a form multiple axially extending helical fluid channels 116. In the following description, embodiments where the nozzle 104a includes flutes 106 that create the axially extending helical fluid channels 116 with the axially extending wall 114a will be used as examples. However, in other embodiments, the flutes 106 may be integral with the structure 102a, such as by being structures of the axially extending wall 114a extending into the hole 110a. In other embodiments, the structures that create the axially extending helical fluid channels 116 may be distributed between the structure 102a and the nozzle 104a in other ways. Regardless, the combination of some portion of the nozzle 104a and the axially extending wall 114a form the axially extending helical fluid channels 116.

The nozzle 104a may be formed from a variety of materials. For example, the nozzle 104a may be formed copper, aluminum, other metals, an alloy, or the like. In other embodiments, the nozzle 104a may be formed from a non-metal material such as a thermosetting polymer. Any material may be used that may be shaped into a desired form and may withstand the temperatures and fluid environment involved in the system 100a. The nozzles 104a may be formed in a variety of ways. For example, the nozzle may be 3D-printed, forged, rolled, cast, or the like.

In some embodiments the nozzle 104a includes a cylindrical center portion 108. The flutes 106 extend radially outward from the cylindrical center portion 108 towards the axially extending wall 114a.

In some embodiments, the cylindrical center portion 108 is hollow. For example, the cylindrical center portion 108 may include a pipe, tubing, and/or be formed from a pipe or tubing. The hollow portion may form part of a path for a thermal exchange fluid such as water, oil, alcohol, or other fluids.

The arrows indicate a direction of fluid flow. The solid arrows indicate a flow in a first direction and the dashed arrows indicate a flow in the reverse direction. That is, in some embodiments, a fluid may flow into the hollow portion of the cylindrical center portion 108 towards the end 111-2 of the structure 102a. In some embodiments, the nozzle 104a may be offset from the end 111-2. In other embodiments, the cylindrical center portion 108 may be offset from the end 111-2 while other portions such as the flutes 106 may contact the end 111-2. Regardless, at the end 111-2, the fluid will reverse direction and enter the axially extending helical fluid channels 116. That is, the fluid will be divided into multiple paths. At the end of the nozzle 104a, the paths may rejoin or may remain separate. In contrast, in the reverse direction, fluid may enter the axially extending helical fluid channels 116 and flow out of the hollow portion of the cylindrical center portion 108.

FIG. 2A-2D are orthographic views of nozzles of a system with helical fluid channels according to some embodiments.

Figure 2A:
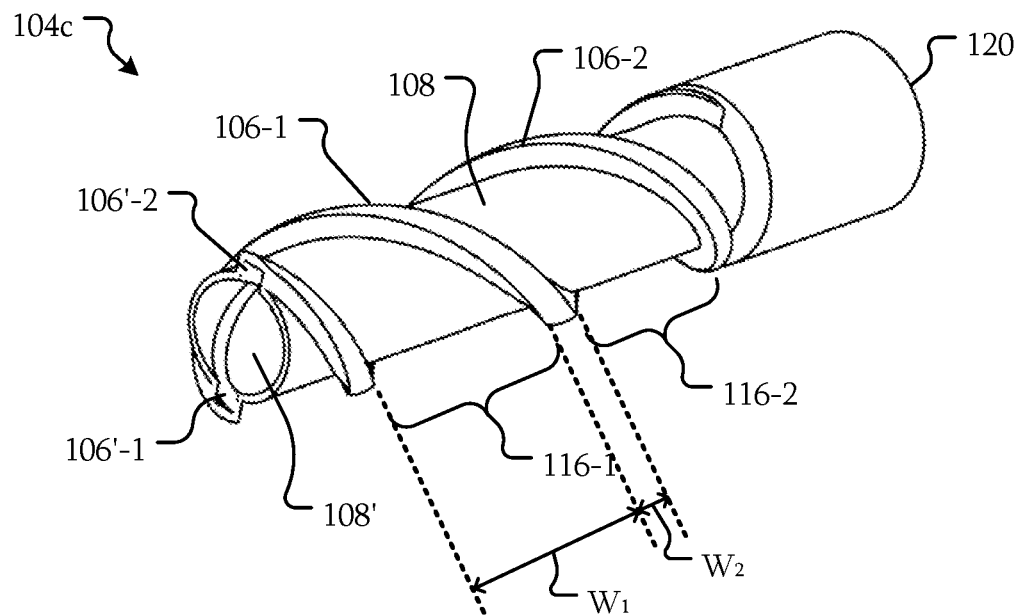
FIGS. 2A-2E are orthographic views of nozzles of a system with helical fluid channels according to some embodiments.

Referring to FIGS. 1A and 2A, the nozzle 104c may be similar to the nozzle 104a of FIG. 1A. Here, the nozzle 104c includes two helical flutes 106-1 and 106-2. The helical flutes 106-1 and 106-2 create two axially extending helical fluid channels 116-1 and 116-2 when used in combination with the axially extending wall 114a.

In some embodiments, a ratio of a width $W_1$ of an axially extending helical fluid channel 116 to a width $W_2$ of the flute 106 is greater than one. That is, an axially extending helical fluid channel 116 may be wider than a width $W_2$ of a flute 106. In some embodiments, the flutes 106 are as narrow as possible to guide the flow of a fluid and still have a sufficient width $W_2$ or other structure to withstand the pressure of the fluid. As a result, the channels 116 may have a greater surface area for heat transfer.

In some embodiments, the flutes 106 comprise an opening 106' extending radially outward from and contiguous with the hollow region 108' of the cylindrical center portion 108. As will be described in further detail below, a nozzle 104c may be formed by shaping a pipe or tubing. The shaping of the wall of the pipe or tubing may form the openings 106'.

In some embodiments, the nozzle 104c includes a portion 120 that does not have flutes 106. In some embodiments, the diameter of the portion 120 may be substantially the same as the diameter of the nozzle 104c including the flutes 106. However, in other embodiments, the portion 120 may have a different diameter such as that of the outer diameter of the cylindrical center portion 108.

Although the flutes 106 have been illustrated has extending in a clockwise manner around the cylindrical center portion 108, in other embodiments, the flutes 106 may extend in a counter-clockwise manner.

Figure 2B:
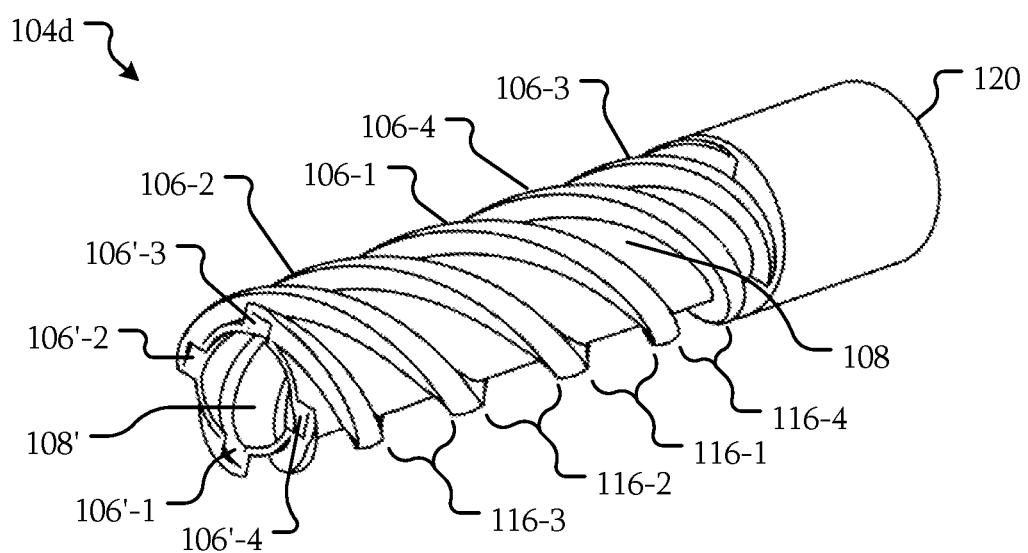

Referring to FIG. 2B, in some embodiments, a number of the flutes 106 may be greater than two. The nozzle 104d may be similar to the nozzle 104c. Here, four flutes 106-1 to 106-4 and corresponding openings 106'-1 to 106'-4 are illustrated as examples; however, in other embodiments, a different number of flutes 106 may be present. In addition, a flute pitch or number of flutes per inch along the major axis of the nozzle 104d is greater than the nozzle 104d; however, in other embodiments, the flute pitch may be the same or less.

In some embodiments, the combination of the number of flutes 106 and the pitch of the flutes 106 determine the path length of the fluid channels 116. Accordingly, the number of flutes 106 and or the pitch of the flutes 106 may be selected to optimize the heat transfer for a particular system.

Figure 2C:
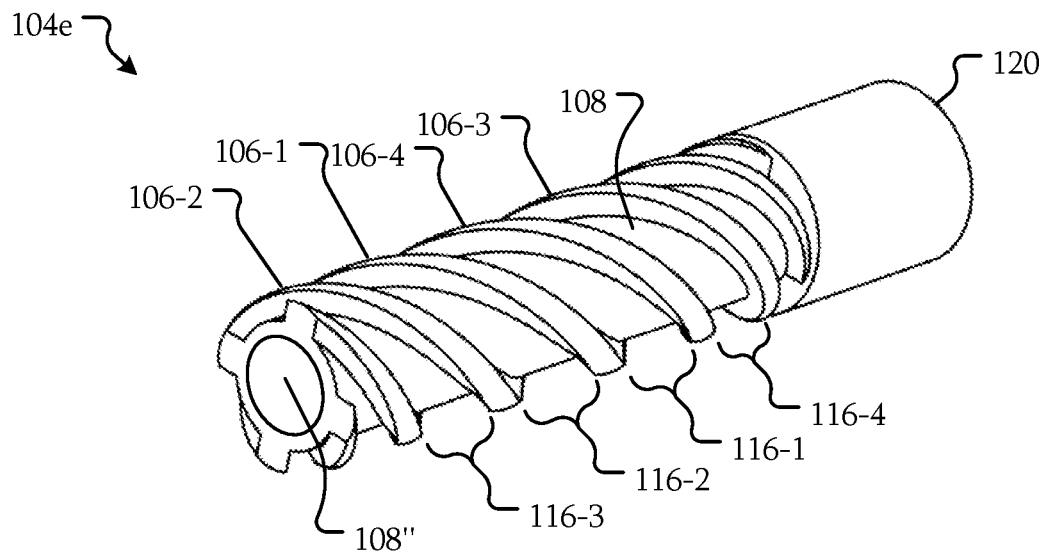

Referring to FIG. 2C, in some embodiments, the flutes 106 may not include the openings 106'. Here, the cylindrical center portion 108 includes an opening 108"; however, the opening 108" may not have a cross-section that is similar to that of the overall nozzle 104e. For example, the opening 108" may have a cylindrical shape.

Referring to FIG. 1B, in some embodiments, the system 100b may be similar to that of the system 100a of FIG. 1A. However, the fluid channels 116 may begin at one end 111-3 of the structure 102b and exit at another end 111-4. Thus, the general flow of a fluid may be in a single axial direction. However, the nozzle 104b and the axially extending wall 114b still create axially extending helical fluid channels 116.

Figure 2D:
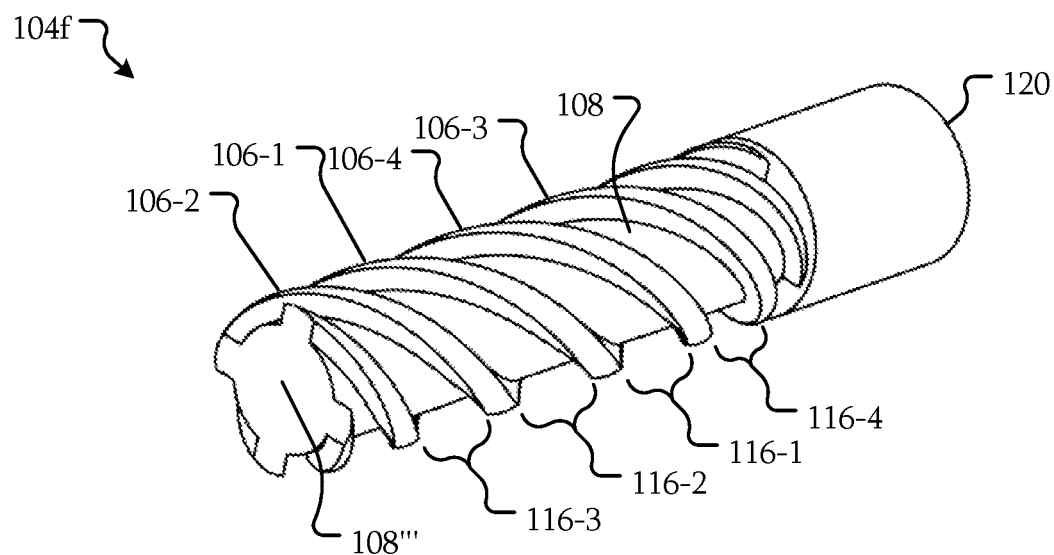

Referring to FIGS. 1B and 2D, the nozzle 104f may be used as the nozzle 104b of FIG. 1B. The nozzle 104f includes a cylindrical center portion 108 that may have at least one or more closed ends 108''' or may be solid throughout. The fluid may pass only through the helical channels 116 and not through an opening in the cylindrical center portion 108. However, in other embodiments, the cylindrical center portion 108 may have an opening as described above.

Referring to FIG. 1C, the system 100c may be similar to the systems 100a and 100b described above. In some embodiments, the flutes 106 may be integrated with the structure 102c. Thus, the hole 110c may not be a smooth cylindrical hole. However, the nozzle 104g may include the cylindrical center portion 108 without the flutes 106. That is, the nozzle 104g may be a section of pipe or tubing. The axially extending helical fluid channels 116 are still created by the mating of the nozzle 104g and the axially extending wall 114c including the flutes 106.

By using the axially extending helical fluid channels 116, the heat that may be transferred may be increased. In particular, the axially extending helical fluid channels 116 cause the fluid to be forced into the axially extending wall 114, increasing the transfer of energy. The axially extending helical fluid channels 116 cause the flow path to be longer and induce turbulence. In contrast, with a straight tube as a nozzle, boundary layers may form, reducing the transfer of energy.

Figure 2E:
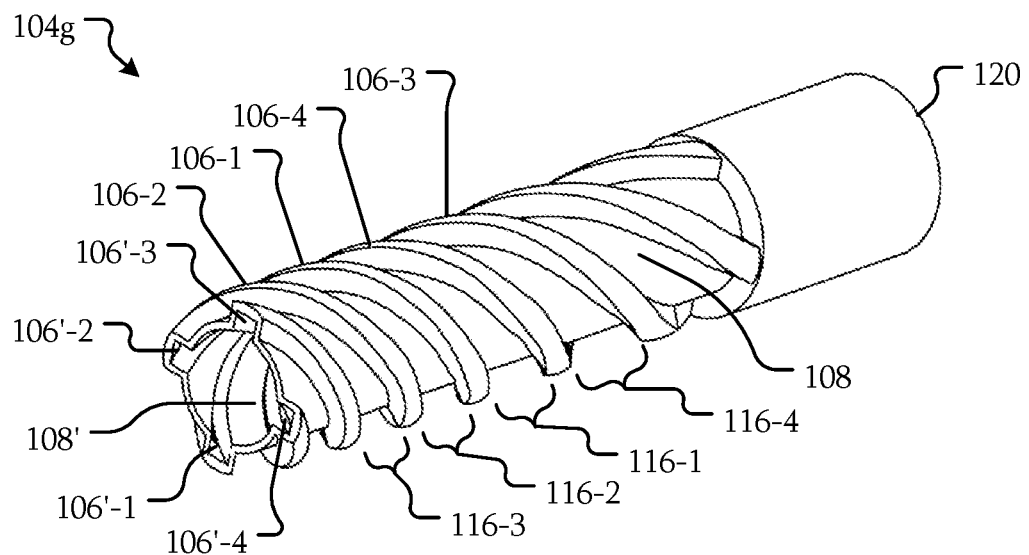

Referring to FIG. 2E, in some embodiments, the nozzle 104g may be similar to the nozzle 104d-104f or the like. However, the nozzle 104g includes a variable flute 106 pitch. Here, the flute 106 pitch varies by a factor of two along the length of the nozzle. In other embodiments, the pitch may vary by a different factor, may vary non-uniformly, monotonically, non-monotonically, or the like. The pitch is smaller closer to the opening 108'; however, in other embodiments, the pitch may be smaller closer to the opposite end. Although a variable pitch has been described with respect to a particular number of flutes 106, other nozzles with a different number of flutes 106 may have a variable pitch. In some embodiments, by varying the pitch along the length of the nozzle 104g, the path length, the width of the helical fluid channels 106, or the like make be varied to achieve a desired heat transfer performance, vary the heat transfer performance along the length of the nozzle, or the like.

Figure 2F:
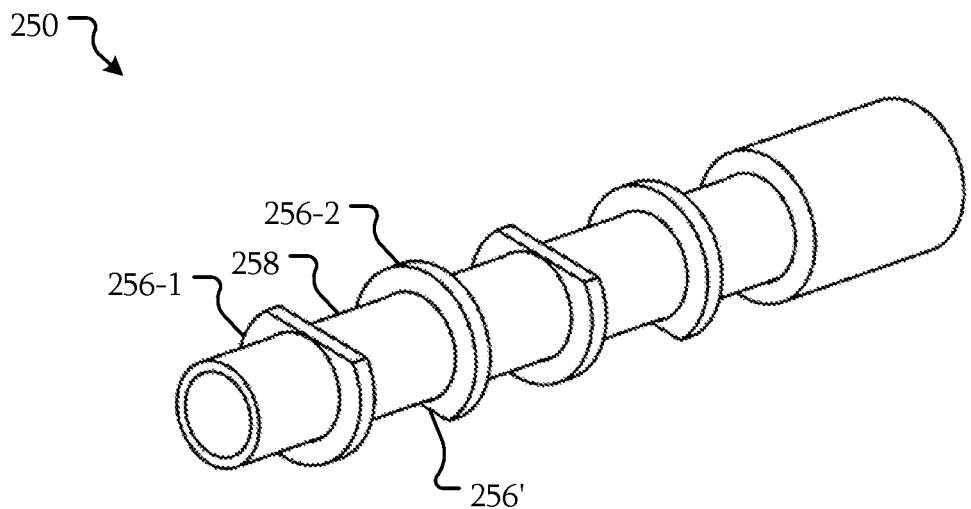
FIG. 2F is an orthographic view of a nozzle with a serpentine fluid channel.
Figure 3:
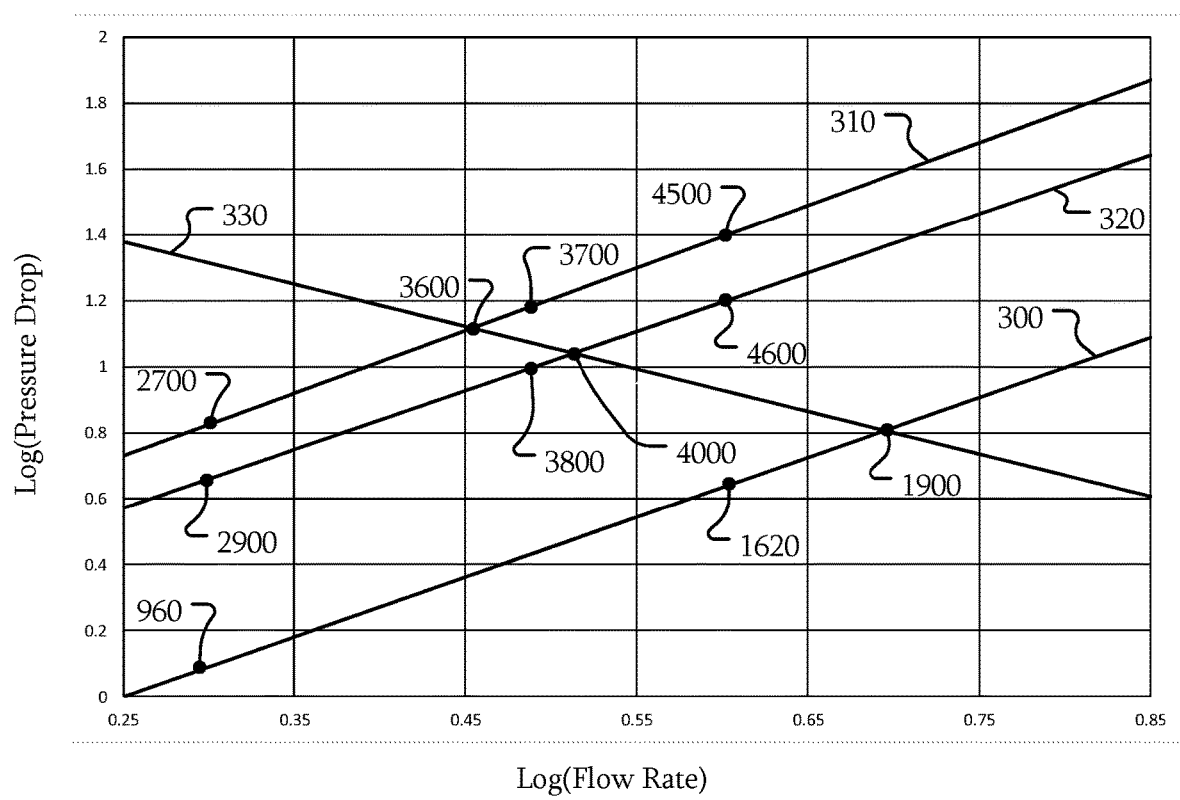
FIG. 3 is a chart illustrating performance of systems with various heat exchanging techniques.

FIG. 2F is an orthographic view of a nozzle with a serpentine fluid channel. The nozzle 250 includes a cylindrical center portion 258. Multiple protrusions 256 extend radially from the cylindrical center portion 258. Each protrusion 256 includes a flat portion 256' that allows fluid to pass the protrusion 256. Adjacent protrusions 256 such as protrusions 256-1 and 256-2 are oriented such that the flat portion 256' of the protrusions 256 are on opposite sides of the cylindrical center portion 258. Accordingly, fluid follows a serpentine path, FIG. 3 is a chart illustrating performance of systems with various heat exchanging techniques. The chart illustrates the pressure drop and heat transfer coefficient for three different nozzle configurations versus flow rate. Configuration 300 is a purely cylindrical nozzle. Configuration 310 is a nozzle with a serpentine fluid channel such as that illustrated in FIG. 2F. Configuration 320 is a nozzle that results in multiple axially extending helical fluid channels, such as those as illustrated in FIGS. 1A-1C and 2A-2D. At various points on the three curves, a number associated with the heat transfer coefficient is illustrated with a dot.

As illustrated for a given flow rate, the cylindrical configuration 300 has the lowest pressure drop, followed by the helical configuration 320 and finally the serpentine configuration 310. However, for the same flow rate, the helical configuration 320 has a higher heat transfer coefficient than either of the other configurations.

An example of a performance of a pump is illustrated as line 330. For the combination of that pump and configurations 310 and 320, the helical configuration 320 has a higher heat transfer coefficient due to the lower pressure drop. As a result, not only does the helical configuration 320 have a higher thermal transfer coefficient at the same flow rate, the lower pressure drop further increases the thermal transfer coefficient for a given pump performance.

Figure 4A:
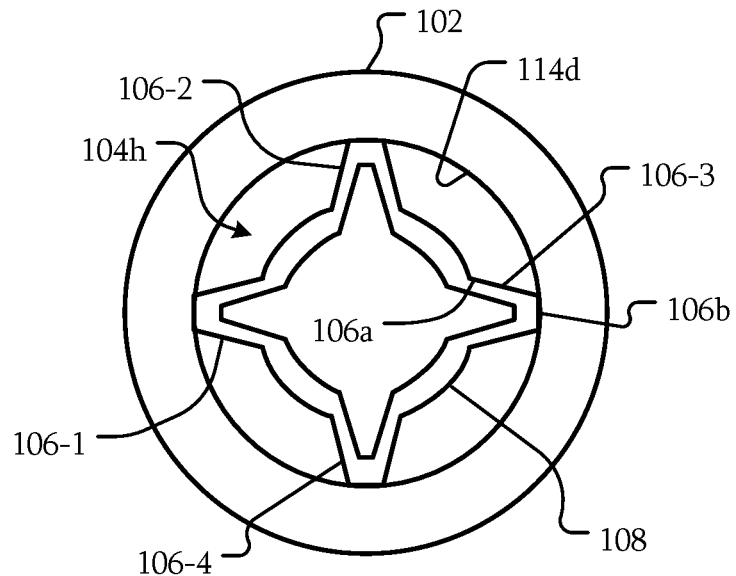
FIGS. 4A and 4B are cross-sectional views of systems with helical fluid channels according to some embodiments.
Figure 4B:
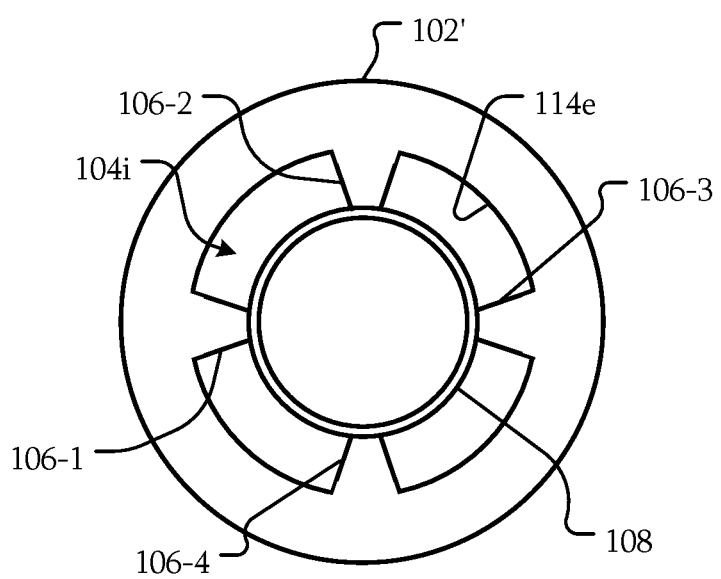

FIGS. 4A and 4B are cross-sectional views of systems with helical fluid channels according to some embodiments. Referring to FIG. 4A, in some embodiments, flutes 106 may integrated with the nozzle 104h, similar to the cross section of FIGS. 1A and 1B. In some embodiments, a wall thickness of the cylindrical center portion 108 is substantially the same as a wall thickness of the flutes 106. As will be described in further detail below, the nozzle 104h may be formed from a pipe or tubing. The resulting wall of the nozzle 104h may have substantially the same wall thickness due to the original substantially uniform wall thickness of the pipe or tubing. Substantially the same wall thickness includes changes in thickness due to the forming of the flutes 106.

In some embodiments, the flutes 106 contact the axially extending wall 114d of the structure 102. For example, the nozzle 104h may have a size that results in an interference fit with the axially extending wall 114d. In other embodiments, the flutes 106 may be brazed, soldered, welded, epoxied, or otherwise connected to the axially extending wall 114c. In still other embodiments, a gap may be present between the tips of the flutes 106 and the axially extending wall 114d and/or the contact may be intermittent along the length of one or more of the flutes 106.

In some embodiments, the flutes 106 may be formed to have a narrower radial distal end 106b than the radially proximate end 106a. As a result, an open area of the axially extending wall 114d may be increased.

Referring to FIG. 4B, in some embodiments, flutes 106 may integrated with the axially extending wall 114e, similar to the cross section of FIG. 1C. The flutes 106 may extend radially inward from the axially extending wall 114e. The nozzle 104i may include a cylinder such as a bar, pipe, and/or tubing. Accordingly, the interface between the axially extending wall 114e including the flutes 106c and the nozzle 104i form the axially extending helical fluid channels 116.

Figure 5:
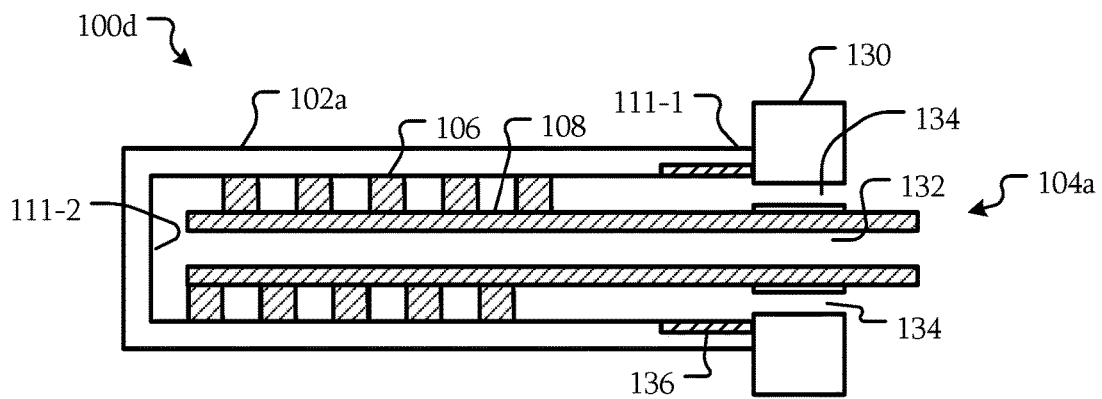
FIG. 5 is a block diagram of a system with helical fluid channels according to some other embodiments.

FIG. 5 is a block diagram of a system with helical fluid channels according to some other embodiments. In some embodiments, the system 100d may be similar to those described herein. The nozzle 104a will be used as an example; however, other embodiments may include different nozzles 104. A nozzle adapter 130 may be coupled to the nozzle 104a. The nozzle adapter 130 may include openings 132 and 134.

The nozzle adapter 130 may be configured to couple to the nozzle 104a to the structure 102a. The nozzle 104a may extend at least partially through or fully through the opening 132. The nozzle 104a may be brazed, soldered, welded, epoxied, or otherwise sealed to the nozzle adapter 130 in the opening 132. Accordingly, fluid may enter or exit through the cylindrical center portion 108 of the nozzle 104a.

The nozzle adapter 130 may be configured to seal the end 111-1 of the hole 110. The nozzle adapter 130 may be brazed, soldered, welded, epoxied, fastened, or otherwise sealed to the structure 102a. In a particular example, screw threads 136 are used to attach the nozzle adapter 130 to the structure 102a.

One or more openings 134 may extend through the nozzle adapter 130 and couple to the helical fluid channels 116. Accordingly, the nozzle 104a in the opening 132 and the one or more openings 134 may form a fluid inlet and outlet into the hole 110. As the fluid flow may be in different directions, the particular structure that is the fluid inlet or fluid outlet may depend on the particular configuration.

Figure 6A:
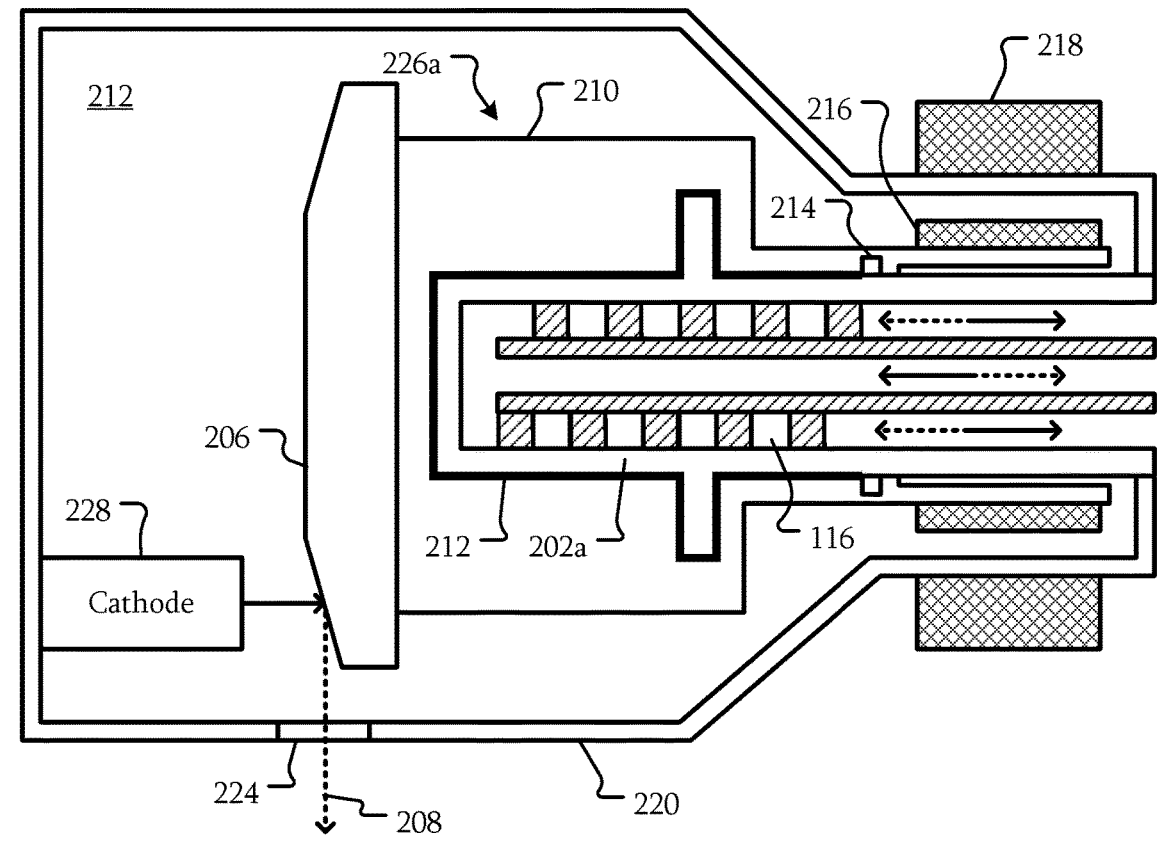

FIGS. 6A-6C are block diagrams of x-ray systems with helical fluid channels according to some embodiments. Referring to FIG. 6A, in some embodiments, an x-ray system 200a includes bearing assembly 210 with a rotor 216 rotatably coupled to a support structure 202a. The support structure 202a may be similar to the structures 102a, 102c, or the like of FIGS. 1A and 1C. The support structure 202a is coupled to a housing 220, forming a vacuum enclosure 222. A stator 218 is coupled to the housing 220. The rotor 216 and stator 218 are configured to rotate the rotor 216 and bearing assembly 210 when actuated.

An anode or target 206 of an anode is mounted on the bearing assembly 210 including the rotor 216. A cathode 228 is configured to emit electrons 204 towards the anode or target 206. As a result, x-rays 208 may be generated and exit the vacuum enclosure 222 through window 224.

In some embodiments, a hydrodynamic bearing 226a may be formed by the bearing assembly 210, the support structure 202a, a bearing liquid 212, and a seal 214. The seal 214 may be coupled between the bearing assembly 210 and the support structure 202a to retain the bearing liquid 212 within the hydrodynamic bearing 226a. In some embodiments, the bearing liquid 212 is a liquid metal such as gallium (Ga), indium (In), tin (Sn), alloys of these or similar metals, or the like.

In some embodiments, the hydrodynamic bearing 226a may conduct heat more efficiently than other types of bearings, such as ball bearings. Accordingly, heat generated by the anode or target 206 may be conducted through the hydrodynamic bearing 226a. In particular, the heat may be conducted through the support structure 202a to the axially extending helical fluid channels 116. As the axially extending helical fluid channels 116 may have a higher thermal transfer coefficient, heat may be removed more efficiently, allowing for greater power input to x-ray system 200a, faster cooling times, and/or higher patient or part throughput. In particular, the x-ray system 200a may be used for various applications, such as security screening (e.g., cargo security screening), non-destructive testing, interventional radiography, computed tomography (CT), radiation therapy, material processing, or the like. The improvements described herein may apply to these and other types of systems.

Referring to FIG. 6B, in some embodiments, the system 200b may be similar to the system 200a of FIG. 6A. However, the hydrodynamic bearing 226b may be configured to have a flow-through structure similar to the system 100b of FIG. 1B. That is, the support structure 202b may be similar to the structure 102b of FIG. 1B. The support structure 202b and the housing 220 still form the vacuum enclosure 222. However, a cooling fluid may pass through the x-ray system 200b rather than reversing direction as in x-ray system 200a of FIG. 6A.

Referring to FIG. 6C, the system 200c may be similar to the system 200a of FIG. 6A; however, the anode or target 206 may be stationary. The anode or target 206c may be mounted on the support structure 202c. The support structure 202c may be similar to the support structure 202a of FIG. 6A; however, structures associated with the hydrodynamic bearing 226a may not be present. Although the use of the structure 202c with helical fluid channels 116 has been illustrated as cooling the anode or target 206c, in other embodiments, the structure 202c may be attached to other structures within the vacuum enclosure 212 to allow cooling of those other structures.

Figure 7A:
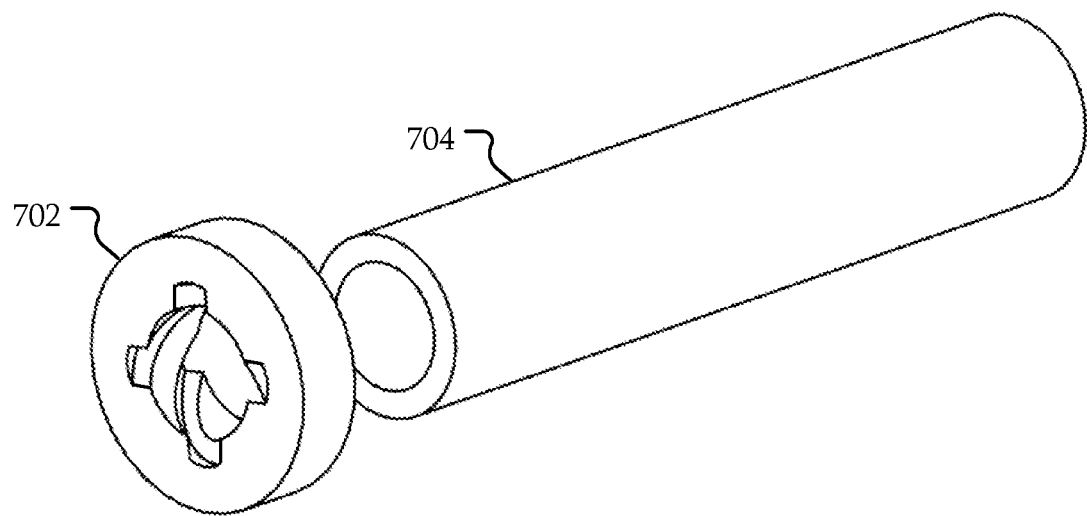
FIGS. 7A-7D are orthographic views of a process of forming a system with helical fluid channels according to some embodiments.
Figure 7B:
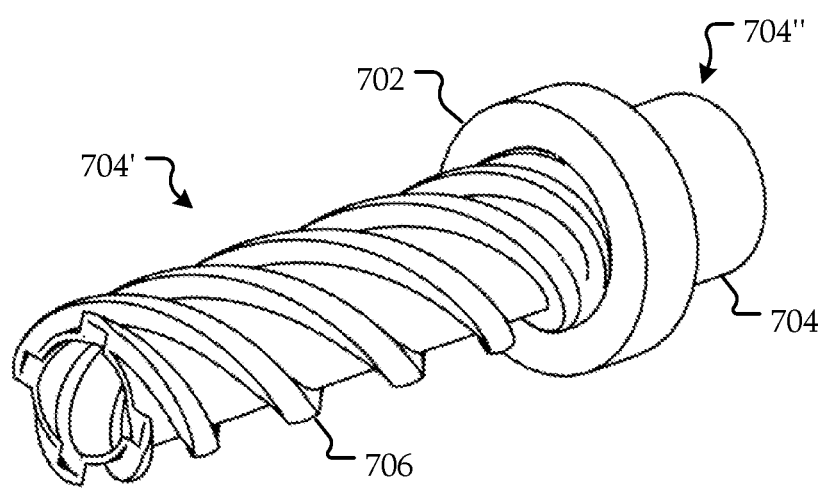

FIG. 7A-7D are orthographic views of a process of forming a system with helical fluid channels according to some embodiments. Referring to FIGS. 7A and 7B, tubing 704 is provided. The tubing 704 may be a tubing that may be formed into different shapes. For example, the tubing may be copper, aluminum, or other metals. In other embodiments, the tubing 704 may be another material that may be deformed such as a thermosetting polymer.

The tubing 704 is shaped to form a plurality of axially extending helical flutes on at least a portion 704' of the tubing 704. As illustrated, the tubing 704 may be passed through a die 702 to form the axially extending helical flutes 706. In some embodiments, a portion 704" of the tubing 704 may not be shaped by the die 702, leaving the original tubing intact.

Figure 7C:
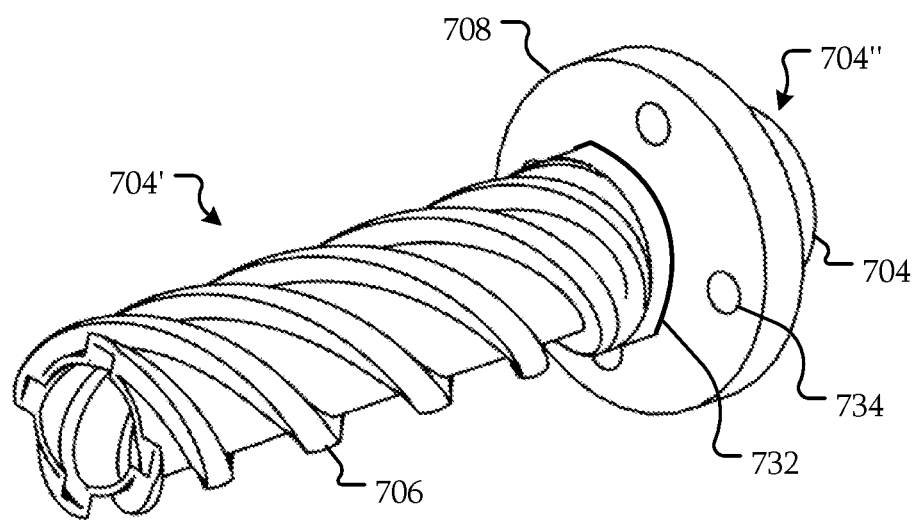

Referring to FIG. 7C, a nozzle adapter 708 is attached to the shaped tubing. The nozzle adapter 708 may be similar to the nozzle adapter 130 of FIG. 5. For example, the nozzle adapter 708 may include openings 734 similar to the openings 134 of the nozzle adapter 130 of FIG. 5. The portion 704" passes through an opening 732 similar to the opening 132 of the nozzle adapter 130 of FIG. 5. The nozzle adapter 708 may be attached to the portion 704" of the tubing 704 where flutes were not formed. The nozzle adapter 708 may be attached by brazing, welding, epoxying, soldering, gaskets, interference fitting, or the like.

Figure 7D:
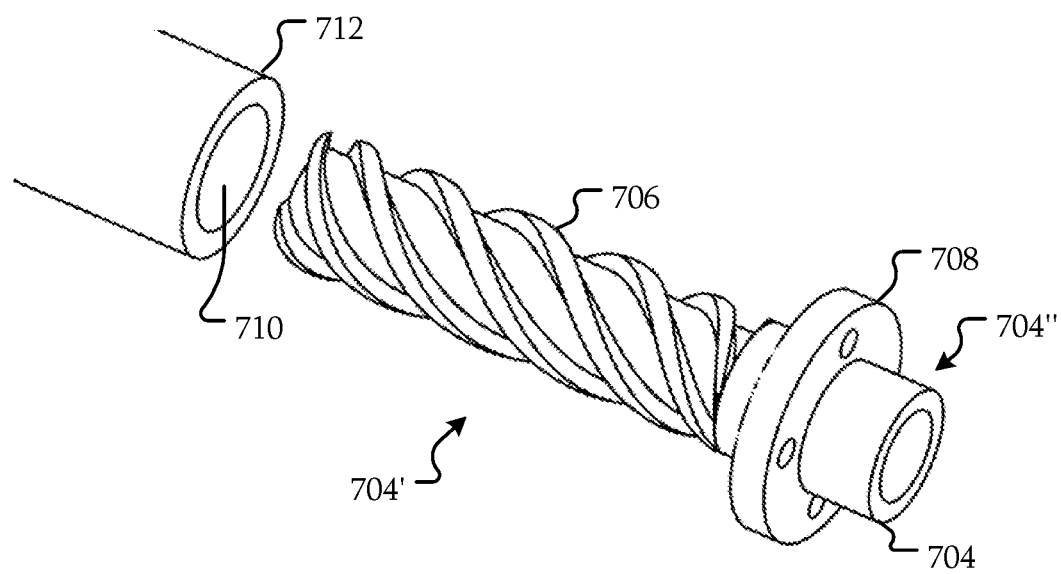

Referring to FIG. 7D, the tubing 704 with the nozzle adapter 708 is inserted into a hole 710 in a structure 712. As a result, axially extending helical fluid channels may be formed. The nozzle adapter 708 may be attached to the structure 712 as descried above, such as by brazing, welding, epoxying, fastening, or the like. The resulting structure may be similar to that of FIG. 5. The structure 712 may be part of a variety of systems. For example, the structure 712 may be part of the support structure 202a of the system 200a of FIG. 6A.

In some embodiments, the forming of a nozzle as described herein may improve cooling efficiency with a reduced impact on assembly and/or manufacturing. For example, the shaping of the tubing 702 may be less intensive and/or less costly than machining a part or attaching external flutes. In addition, by selecting a particular size of the tubing 704 and a particular die 702, a diameter and/or pitch of the fluted portion 704' of the nozzle may be controlled with greater accuracy, increasing the localized thermal transfer performance and fit.

Figure 8:
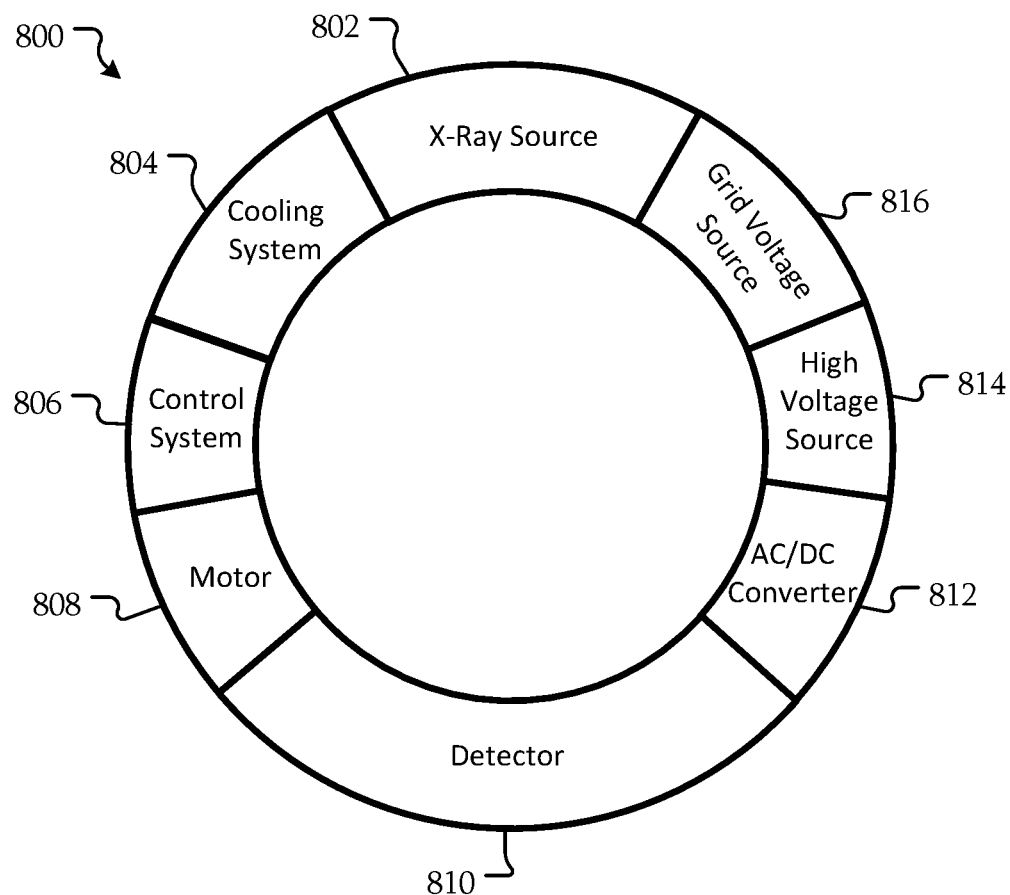
FIG. 8 is a block diagram of a computerized tomography (CT) gantry according to some embodiments.

FIG. 8 is a block diagram of a computerized tomography (CT) gantry according to some embodiments. In some embodiments, the CT gantry includes an x-ray source 802, a cooling system 804, a control system 806, a motor drive 808, a detector 810, an AC/DC converter 812, a high voltage source 814, and a grid voltage source 816. The x-ray source 802 may include a structure with multiple axially extending helical fluid channels as described above. Although particular components have been used as examples of components that may be mounted on a CT gantry, in other embodiments, the other components may be different. Although a CT gantry is used as an example of a system that includes a structure with multiple axially extending helical fluid channels as described herein, a structure with multiple axially extending helical fluid channels described herein may be used in other types of systems.

Figure 9:
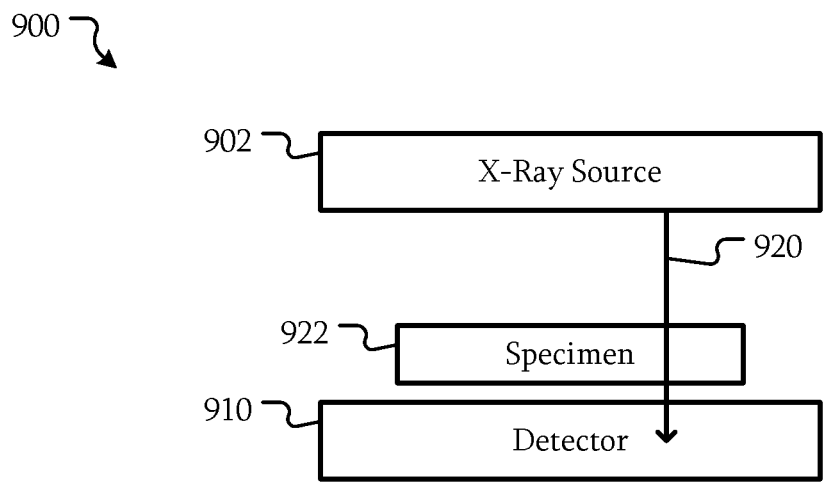
FIG. 9 is a block diagram of a 2D x-ray imaging system according to some embodiments.

FIG. 9 is a block diagram of a 2D x-ray imaging system according to some embodiments. The imaging system 900 includes an x-ray source 902 and a detector 910. The x-ray source 902 may include a structure with multiple axially extending helical fluid channels as described above. The x-ray source 902 is disposed relative to the detector 910 such that x-rays 920 may be generated to pass through a specimen 922 and detected by the detector 910.

Some embodiments include an x-ray system, comprising: a structure 102 having a hole 110 having an axially extending wall 114; and a nozzle 104 disposed in the hole 110; wherein the nozzle 104 and the axially extending wall 114 form a plurality of axially extending helical fluid channels 116.

In some embodiments, the nozzle 104 comprises: a cylindrical center portion 108; and a plurality of flutes 106 extending radially outward from the cylindrical center portion 108.

In some embodiments, the cylindrical center portion 108 is hollow; the hole 110 includes a closed end 111-2; and the cylindrical center portion 108 is offset from the closed end 111-2.

In some embodiments, the flutes 106 are offset from the closed end 111-2.

In some embodiments, the flutes 106 comprise an opening extending radially outward from and contiguous with the hollow portion of the cylindrical center portion 108.

In some embodiments, a wall thickness of the cylindrical center portion 108 is substantially the same as a wall thickness of the flutes 106.

In some embodiments, the flutes 106 contact the axially extending wall 114.

In some embodiments, a ratio of a width of the axially extending helical fluid channels 116 to a width of the flutes 106 is greater than one.

In some embodiments, a width of the flutes 106 at a radially distal end is different from a width of the flutes 106 at a radially proximal end.

In some embodiments, a pitch of the flutes 106 varies along a length of the nozzle 104.

In some embodiments, a width of at least one of the axially extending helical fluid channels 106 varies along a length of the nozzle 104.

In some embodiments, the axially extending wall 114 comprises a plurality of flutes 106 extending radially inward; and the nozzle 104 comprises a cylinder.

In some embodiments, the x-ray system further comprises a nozzle 104 adapter including a first opening and at least one second opening; wherein: the nozzle 104 adapter seals an end of the hole 110; the nozzle 104 is disposed in the first opening; and the nozzle 104 and the at least one second opening form a fluid inlet and a fluid outlet.

In some embodiments, the structure is at least a portion of a support structure 202 of a hydrodynamic bearing 226; the x-ray system further comprises: an anode 206 mounted on the hydrodynamic bearing 226; and a cathode 228 configured to emit electrons towards the anode 206.

In some embodiments, the x-ray system further comprises a liquid metal disposed in the hydrodynamic bearing 226.

Some embodiments include an x-ray system formed by a process comprising: providing tubing 704; shaping the tubing 704 to form a plurality of axially extending helical flutes 106; and forming a plurality of axially extending helical fluid channels 116 by inserting the shaped tubing into a hole 110/710 in a structure 102.

In some embodiments, shaping the tubing 704 comprises passing the tubing 704 through a die 702 rotating relative to the tubing 704.

In some embodiments, the hole 110/710 is a blind hole.

In some embodiments, the structure 102/202 at least part of a hydrodynamic bearing 226 of the x-ray system 200.

In some embodiments, the x-ray system is further formed by attaching a nozzle adapter 130/708 to the shaped tubing. In some embodiments, the x-ray system is further formed by attaching the nozzle adapter to the structure 102.

Some embodiments include an x-ray system, comprising means for receiving a cooling fluid; means for supporting a portion of a bearing assembly; and means for dividing the cooling fluid into a plurality of axially extending helical streams within the means for supporting the portion of bearing assembly. Examples of the means for receiving a cooling fluid include the inlets described above such as the hollow portion of the nozzle 104, the axially extending helical fluid channels 116, or the openings 134. Examples of the means for supporting a portion of a bearing assembly include the systems 100 and support structures 202. Examples of the means for dividing the cooling fluid into a plurality of axially extending helical streams within the means for supporting the portion of the bearing assembly include the flutes 106.

In some embodiments, the x-ray system further comprises means for reversing a direction of flow of the cooling fluid in the means for supporting the portion of the bearing assembly. Examples of the means for reversing a direction of flow of the cooling fluid in the means for supporting the portion of the bearing assembly include the closed end 111-2 of the hole 110a, the flutes 106, and the cylindrical center portion 108.

In some embodiments, the means for supporting the portion of the bearing assembly comprise means for supporting a hydrodynamic bearing. Examples of the means for supporting a hydrodynamic bearing include support structures 202a and 202b.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; claim 5 can depend from any one of claim 1, 2, 3, or 4, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112 ¶ 6. Embodiments of the invention in which an exclusive property or privilege is claimed are defined as follows.

The invention claimed is:

1. An x-ray system, comprising:
a structure having a hole having an axially extending wall; and
a nozzle disposed in the hole, comprising:
a cylindrical center portion; and
a plurality of flutes extending radially outward from the cylindrical center portion;
wherein:
the nozzle and the axially extending wall form a plurality of axially extending helical fluid channels; and
the flutes comprise an opening extending radially outward from and contiguous with a hollow portion of the cylindrical center portion.

2. The x-ray system of claim 1, wherein:
the cylindrical center portion is hollow;
the hole includes a closed end; and
the cylindrical center portion is offset from the closed end.

3. The x-ray system of claim 2, wherein the flutes are offset from the closed end.

4. The x-ray system of claim 1, wherein a wall thickness of the cylindrical center portion is substantially the same as a wall thickness of the flutes.

5. The x-ray system of claim 1, wherein the flutes contact the axially extending wall.

6. The x-ray system of claim 1, wherein a ratio of a width of the axially extending helical fluid channels to a width of the flutes is greater than one.

7. The x-ray system of claim 1, wherein a width of at least one of the axially extending helical fluid channels varies along a length of the nozzle.

8. The x-ray system of claim 1, further comprising:
a nozzle adapter including a first opening and at least one second opening;
wherein:
the nozzle adapter seals an end of the hole;
the nozzle is disposed in the first opening; and
the nozzle and the at least one second opening form a fluid inlet and a fluid outlet.

9. The x-ray system of claim 1, wherein:
the structure is at least a portion of a support structure of a hydrodynamic bearing;
the x-ray system further comprises:
an anode mounted on the hydrodynamic bearing; and
a cathode configured to emit electrons towards the anode.

10. The x-ray system of claim 9, further comprising a liquid metal disposed in the hydrodynamic bearing.

11. An x-ray system formed by a process comprising:
providing tubing;
shaping the tubing to form a plurality of axially extending helical flutes, comprising passing the tubing through a die rotating relative to the tubing around a major axis of the tubing;
providing a structure of the x-ray system including a hole; and
forming a plurality of axially extending helical fluid channels by inserting the shaped tubing into the hole in the structure of the x-ray system.

12. The x-ray system of claim 11, wherein the hole is a blind hole.

13. The x-ray system of claim 11, wherein the structure is at least part of a hydrodynamic bearing of the x-ray system.

14. The x-ray system of claim 11, further comprising: attaching a nozzle adapter to the shaped tubing.

15. An x-ray system, comprising:
- means for receiving a cooling fluid;
- means for supporting a portion of a bearing assembly; and
- means for dividing the cooling fluid into a plurality of axially extending helical streams within the means for supporting the portion of the bearing assembly, comprising:
  - a cylindrical center portion; and
  - a plurality of flutes extending radially outward from the cylindrical center portion;
  - wherein the flutes comprise an opening extending radially outward from and contiguous with a hollow portion of the cylindrical center portion.

16. The x-ray system of claim 15, wherein the means for supporting the portion of the bearing assembly comprise means for supporting a hydrodynamic bearing.

* * * * *